Figure 1:
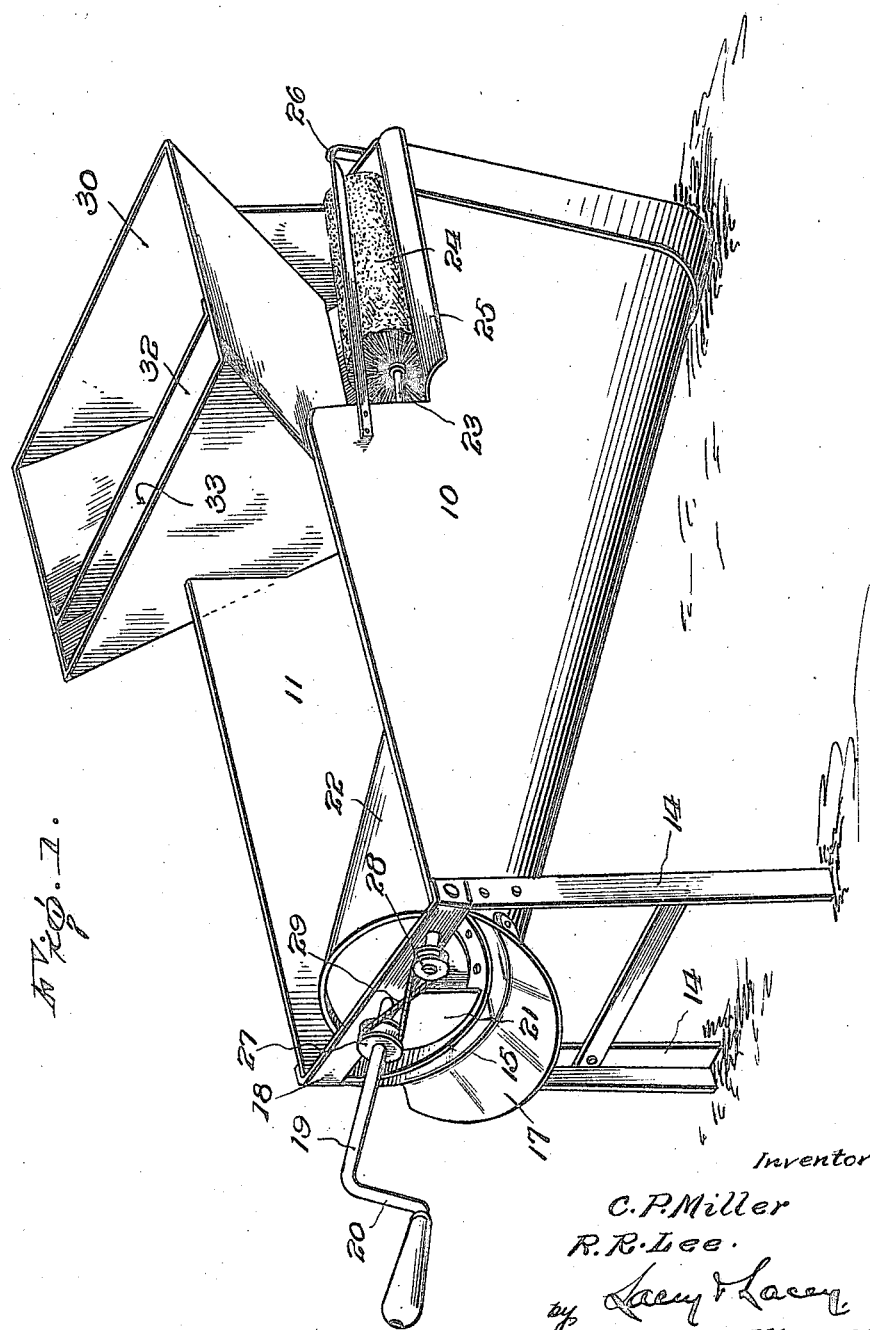

C. P. MILLER AND R. R. LEE.
GRAIN WASHING MACHINE.
APPLICATION FILED AUG. 13, 1919.

1,403,092.

Patented Jan. 10, 1922.
3 SHEETS—SHEET 1.

Inventors:
C. P. Miller
R. R. Lee.
by Lacy & Lacy
Attorneys.

C. P. MILLER AND R. R. LEE.
GRAIN WASHING MACHINE.
APPLICATION FILED AUG. 13, 1919.

1,403,092.

Patented Jan. 10, 1922.
3 SHEETS—SHEET 3.

Inventors:
C. P. Miller
R. R. Lee
by Lacey & Lacey
Attorneys.

UNITED STATES PATENT OFFICE.

CARL P. MILLER AND RALPH R. LEE, OF FARGO, NORTH DAKOTA.

GRAIN-WASHING MACHINE.

1,403,092. Specification of Letters Patent. Patented Jan. 10, 1922.

Application filed August 13, 1919. Serial No. 317,366.

*To all whom it may concern:*

Be it known that we, CARL P. MILLER and RALPH R. LEE, citizens of the United States, residing at Fargo, in the county of Cass and State of North Dakota, have invented certain new and useful Improvements in Grain-Washing Machines, of which the following is a specification.

This invention relates to an improved machine for removing smut from grain as well as also removing foreign seeds therefrom and has as one of its principal objects to provide a machine of this character wherein the grain may be readily fed into the machine while the machine will be provided with a conveyer for discharging the cleaned grain therefrom so that the grain may be cleaned with ease and facility.

The invention has as a further object to provide a machine employing a container for holding a solution and wherein a brush will be provided for sweeping the smut and foreign seeds from the surface of the solution to be discharged from the container.
The invention has as a further object to provide a machine wherein the solution will be automatically maintained at a constant level within the container.

And the invention has as a still further object to provide a machine wherein the grain-discharging conveyer as well as the sweeping brush employed will be simultaneously operated.

Other and incidental objects will appear hereinafter.

Figure 2:
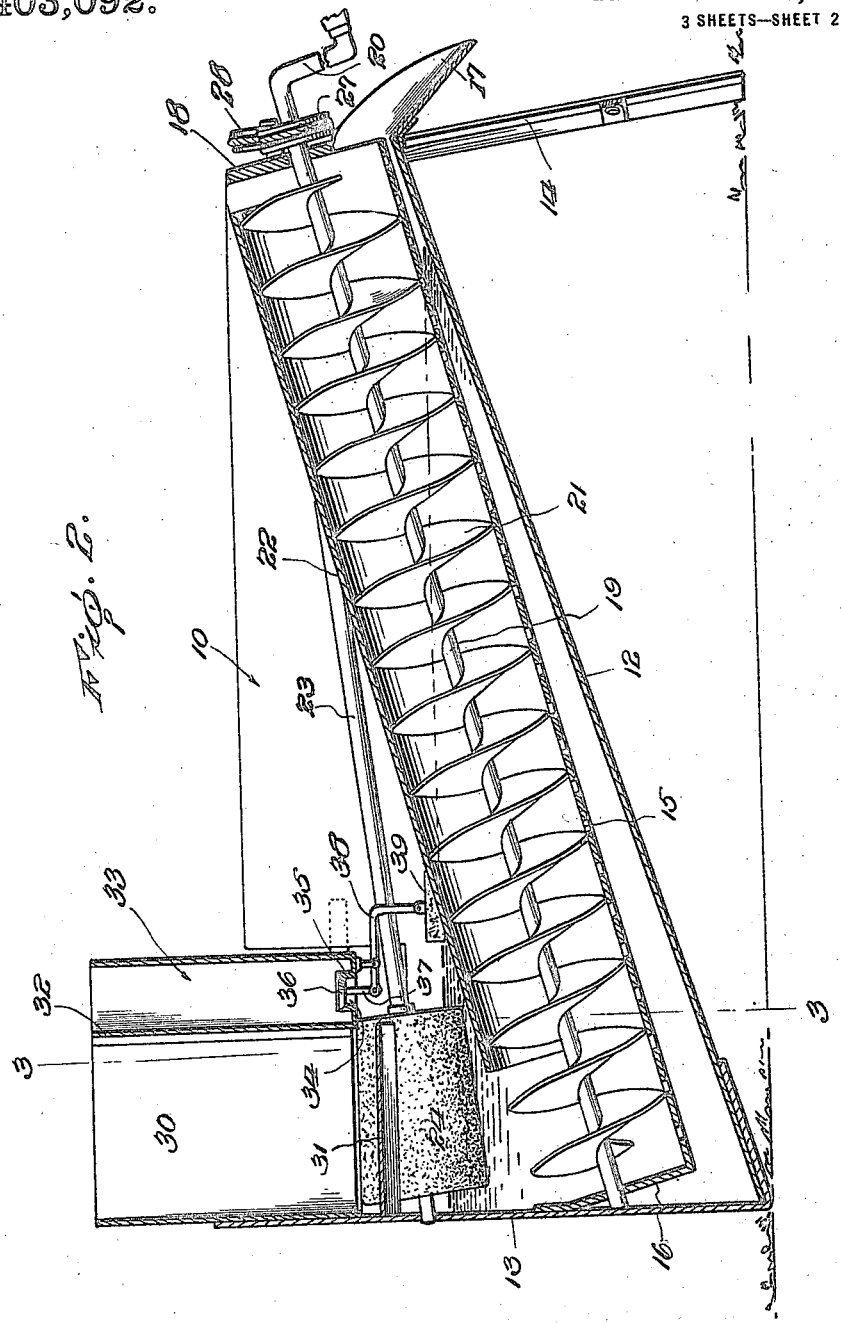
Figure 3:
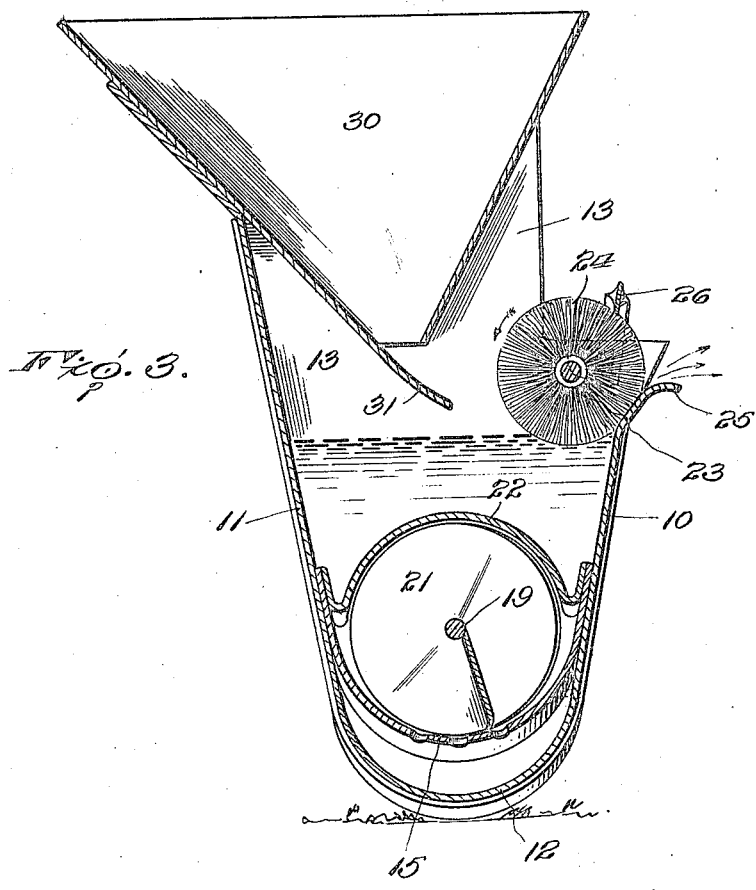
Figure 4:
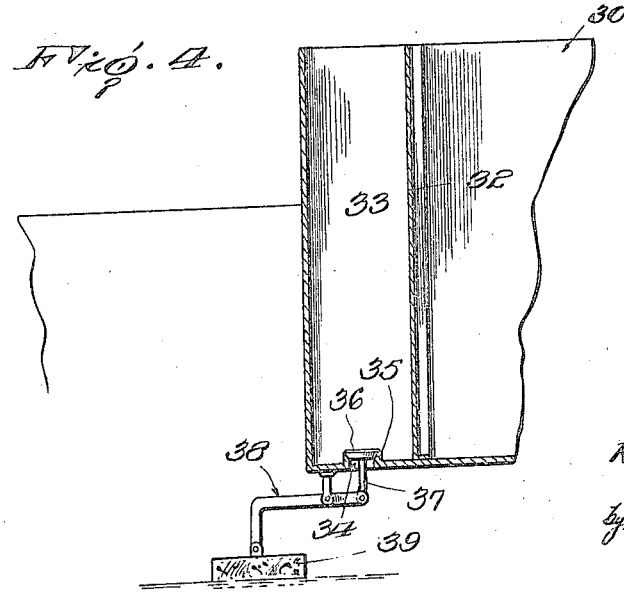

In the drawings:

Figure 1 is a perspective view of our improved machine,

Figure 2 is a longitudinal sectional view taken centrally through the machine, Figure 3 is a vertical sectional view taken on the line 3—3 of Figure 2, and Figure 4 is a fragmentary vertical sectional view particularly illustrating the float operated valve employed for controlling the feeding of the grain-cleaning solution to the container of the device.

In carrying the invention into effect, we employ a container body which is preferably formed from a single piece of suitable sheet metal bent to provide side walls which, for convenience, have been indicated at 10 and 11 respectively, a bottom wall 12, and one end wall 13. The side walls 10 and 11 diverge upwardly and, as will be observed upon particular reference to Figure 2 of the drawings, the container is gradually increased in depth toward one end. Suitably connected to the side walls at the opposite end of the container are supporting legs 14, the container resting at its deeper end upon the bottom wall thereof. Thus, the container is supported in such position that the bottom wall slopes upwardly toward the leg-supported end of the container. Suitably fixed to the side walls 10 and 11 within the container is a false bottom 15 provided at its lower end with an end wall 16 secured to the end wall 13 of the container. The false bottom 15 is arranged in spaced relation to the bottom wall 12 of the container and diverges downwardly from said wall. Formed in the false bottom is a plurality of drain openings. At its outer or upper end the false bottom terminates flush with the bottom wall 12 of the container and secured to the latter bottom wall is a discharge spout 17.

Extending transversely between the side walls 10 and 11 of the container at the higher end thereof is a cross strip or bar 18 and journaled through this bar is a conveyer shaft 19 the lower end of which is journaled through the end wall 16 of the false bottom 15. The shaft extends in parallel relation to the false bottom and is bent at its outer end to provide a crank 20. Formed on or otherwise secured to the shaft is a conveyer screw 21 and overlying this screw is a curved housing plate 22 suitably connected at its side margins with the side walls of the container, it being observed upon reference to Figure 3, that the marginal portions of the housing plate are preferably fixed against the side margins of the false bottom 15. Thus, the housing plate 22 will cooperate with the false bottom to provide a conveyer tube snugly receiving the conveyer screw. The plate 22 terminates short of the lower end of the false bottom so that the conveyer tube is thus open at its lower end. Journaled through the cross strip 18 and the end wall 13 of the container is a shaft 23 which is, as particularly shown in Figures 2 and 3, disposed adjacent the upper edge of the side wall 10 of the container and lies parallel to said wall, being slightly inclined downwardly from the strip 18 toward the wall 13. Secured to the said shaft adjacent the wall 13 is a suitable brush 24 and, as will now be observed, the side wall 10 is, opposite the brush, notched out and a portion of the wall curved laterally outward to provide an upwardly directed discharge spout or flange 25 of a length substantially equal to the length of the brush. Extending between said side wall and the end wall 13 of the container over the brush is a scraper 26. Fixed to the upper end of the shaft 19 is a pulley 27. A similar pulley 28 is fixed to the shaft 23 and extending between these pulleys is a belt 29 so that when the crank 20 is operated for turning the conveyer screw, the brush 24 will also be rotated, it being noted that the belt is twisted so that the brush will be turned in a direction opposite to the direction of rotation of the screw.

Suitably secured to the end wall 13 of the container is a hopper 30 provided at its lower end with a suitable discharge slot beneath which one of the converging side walls of the hopper is extended to form a laterally directed discharge flange 31 extending toward the brush 24. Fixed within the hopper adjacent one of the end walls thereof is a partition 32 defining a solution supply vessel 33. Formed in the bottom wall of this vessel is a discharge opening 34 around which is a valve seat 35 and arranged to cooperate with said seat is a valve 36 from which depends a stem 37. Suspended from the bottom wall of the vessel is a pivoted valve lever 38 connected at one end to the lower end of said stem. The opposite end of said lever is bent to project downwardly within the container and mounted upon the lower terminal of the lever is a float 39.

In use, the container is first filled with a proper cleaning solution and a supply of the solution is placed within the vessel 33. As will be clear, as long as the solution within the container remains at a proper level, the valve 36 of the vessel will be held closed by the float 39. However, as soon as the level of the solution in the container falls, the float 39 will drop, opening the valve and admitting enough of the solution from the supply vessel into the container to maintain the proper level, when said valve will be again closed. Thus, the level of the solution in the container will be automatically maintained relatively constant. The grain to be cleaned is, of course, placed within the hopper 30 and will be slowly fed through the discharge opening at the bottom of the hopper into the container where the grain will collect at the lower end of the conveyer tube. The grain will thus be submerged within the cleaning solution so that the solution will act thereon for removing any smut from the grain. Consequently, when the crank 20 is turned, the conveyer screw will be rotated for discharging cleaned grain at the spout 17, the solution being allowed to drain from the grain through the openings in the false bottom 15 as the grain passes over the upper end portion of said false bottom. Upon the discharge of the grain from the hopper into the container king heads and foreign seeds will, of course, float upon the surface of the solution. Since, as previously explained, the brush 24 will be rotated coincident with the turning of the conveyer screw, this foreign matter floating upon the surface of the solution will be caught by the brush and swept out at the discharge spout 25. Thus, it will be seen that by simply turning the crank 20 the machine may be operated for cleaning grain and discharging cleaned grain from the machine as well as discharging foreign matter cleaned from the grain.

Having thus described the invention, what is claimed as new is:

1. A grain washing machine comprising a container having an end wall and a transversely curved longitudinally inclined bottom wall, the upper end of said bottom wall terminating in a discharge spout, an inclined tube arranged longitudinally within the container adjacent the transversely curved bottom wall of the same to diverge toward its inner end away from the bottom wall and having perforations, the upper side of said tube being provided with a grain-receiving opening, a hopper having discharge means above said opening, the bottom wall of said tube being bent up and secured to the end wall of said container for closing the lower end of the tube, a skimming brush arranged adjacent the lower end of said hopper and having a shaft extending from end to end of the container rotatably fitting through said end wall, a conveyer within said tube, and means whereby said conveyer and said skimming brush may be rotated simultaneously.

2. A grain-washing machine comprising a container having a transversely curved longitudinally inclined bottom wall, a side wall provided with an outwardly and upwardly directed flange, a skimming brush having bristles contacting with said flange at a point spaced from the end of the same, a stationary scraper rigidly connected to said container and contacting with the bristles of said brush at a point above said flange, a tube having an opening, a hopper arranged above said opening, a conveyer arranged within said tube, and means whereby said brush and said conveyer may be rotated simultaneously.

3. A grain-washing machine comprising a container having a longitudinally inclined transversely curved bottom wall, a tube arranged within said container adjacent said bottom wall to diverge toward its inner end away from the bottom wall and inclusive of upper and lower sections having their longitudinal edge portions secured to the sides of said container, the lower section of said tube being perforated and the upper section of said tube being provided with a grain-receiving opening, a hopper carried by said container and provided with a partition forming grain and liquid-receiving compartments, said grain-receiving compartment being provided with a discharge opening, a fluid actuated valve for said liquid compartment, and a conveyer arranged within said tube.

In testimony whereof we affix our signatures.

CARL P. MILLER. [L. S.]
RALPH R. LEE. [L. S.]